US012614381B2

(12) United States Patent
Chen

(10) Patent No.: US 12,614,381 B2
(45) Date of Patent: Apr. 28, 2026

(54) IMAGE PROCESSING METHOD AND APPARATUS

(71) Applicant: Beijing Zitiao Network Technology Co., Ltd., Beijing (CN)

(72) Inventor: Kai Chen, Beijing (CN)

(73) Assignee: Beijing Zitiao Network Technology Co., Ltd., Beijing (CN)

( * ) Notice: Subject to any disclaimer, the term of this patent is extended or adjusted under 35 U.S.C. 154(b) by 251 days.

(21) Appl. No.: 18/552,053

(22) PCT Filed: Apr. 12, 2022

(86) PCT No.: PCT/CN2022/086318
§ 371 (c)(1),
(2) Date: Sep. 22, 2023

(87) PCT Pub. No.: WO2022/222788
PCT Pub. Date: Oct. 27, 2022

(65) Prior Publication Data
US 2024/0177467 A1 May 30, 2024

(30) Foreign Application Priority Data

Apr. 19, 2021 (CN) .......................... 202110418021.5

(51) Int. Cl.
*G06V 10/80* (2022.01)
*G06V 10/25* (2022.01)
(Continued)

(52) U.S. Cl.
CPC ............ *G06V 10/806* (2022.01); *G06V 10/25* (2022.01); *G06V 10/44* (2022.01); *G06V 40/171* (2022.01); *G06V 2201/07* (2022.01)

(58) Field of Classification Search
CPC .... G06V 10/806; G06V 10/25; G06V 40/171; G06V 10/44; G06V 2201/07
See application file for complete search history.

(56) References Cited

U.S. PATENT DOCUMENTS

2020/0226724 A1 7/2020 Fang et al.

FOREIGN PATENT DOCUMENTS

| CN | 108257084 A | 7/2018 |
| CN | 111028142 A | 4/2020 |
(Continued)

OTHER PUBLICATIONS

Jiang, W., Liu, S., Gao, C., Cao, J., He, R., Feng, J., & Yan, S. (2020). Psgan: Pose and expression robust spatial-aware gan for customizable makeup transfer. In Proceedings of the IEEE/CVF conference on computer vision and pattern recognition (pp. 5194-5202). (Year: 2020).*

(Continued)

*Primary Examiner* — David Perlman
(74) *Attorney, Agent, or Firm* — Faegre Drinker Biddle & Reath LLP

(57) ABSTRACT

An image processing method including: obtaining a target feature and a reference feature, the target feature is a feature obtained by performing feature extraction on a target object in a target image, and the reference feature is a feature obtained by performing feature extraction on a reference object in a reference image; obtaining a migration matrix, the migration matrix is used for controlling the reference feature to be fused with the target feature at a designated weight; fusing the target feature and the reference feature according to the migration matrix to obtain a fused feature; and generating a migration result image according to the fused feature and the target image. An image processing apparatus, an electronic device, a storage medium and a program product are also disclosed.

17 Claims, 4 Drawing Sheets

(51) Int. Cl.
  *G06V 10/44*        (2022.01)
  *G06V 40/16*        (2022.01)

(56)                References Cited

FOREIGN PATENT DOCUMENTS

| CN | 111640057 A | 9/2020 |
| CN | 111652830 A | 9/2020 |
| CN | 111738048 A | 10/2020 |
| CN | 111815534 A | 10/2020 |

OTHER PUBLICATIONS

International Search Report for International Application No. PCT/CN2022/086318, mailed Jul. 6, 2022, 8 Pages.

International Preliminary Report on Patentability issued Oct. 24, 2023 in International Application No. PCT/CN2022/086318, with English translation (11 pages).

Written Opinion of the International Searching Authority issued Jul. 6, 2022 in International Application No. PCT/CN2022/086318, with English translation (10 pages).

Li, Yijun et al., "Universal Style Transfer via Feature Transforms," NIPS'17: Proceedings of the 31st International Conferences on Neural Information Processing Systems, Apr. 12, 2017, pp. 385-395.

Office action received from Chinese patent application No. 202110418021.5 mailed on Sep. 12, 2025, 14 pages (7 pages English Translation and 7 pages Original Copy).

\* cited by examiner 31          32

(a)                    (b)

Please input a weight parameter

Weight
parameter = [40%]  0%                                    100%    ~ 400

<u>600</u>

IMAGE PROCESSING METHOD AND APPARATUS

The present application is a National Stage Entry of International application No. PCT/CN2022/086318 filed on Apr. 12, 2022, which claims the priority to the Chinese patent application No. 202110418021.5 filed on Apr. 19, 2021, and entitled "IMAGE PROCESSING METHOD AND APPARATUS", the disclosure of which is incorporated herein by reference in its entirety.

TECHNICAL FIELD

The present disclosure relates to the technical field of image processing, and in particular, to an image processing method and apparatus.

BACKGROUND

Currently, image feature migration has become one of the popular techniques in the field of image processing. The image feature migration refers to a process of migrating a feature of a reference object in a reference image into a target image, and fusing the feature of the reference object with a feature of a target object in the target image to generate a migration result image. For example: in the image feature migration, makeup migration is: migrating a feature of face makeup in a reference image into a target image, and fusing the feature of the face makeup in the reference image with a feature of a face in the target image, to obtain a migration result image of making up the face in the target image based on the face makeup in the reference image.

In the related art, a main implementation of the image feature migration is: by taking a reference image containing a reference object and a target image containing a target object as inputs, inputting the reference image and the target image into a pre-trained image migration model, and obtaining an output of a feature fusion model as a migration result image. Although the migration of the image feature can be implemented by this image feature migration mode in the related art, a user cannot control a migration effect in the migration result image. For example: in a scenario of makeup migration, when a user feels that face makeup in a reference image is too heavy, a user's demand might be not to completely migrate the face makeup of the reference image to a target face in a target image, but to migrate the face makeup of the reference image to the target face in the target image to some extent; however, in the image feature migration mode in the related art, given the reference image and the target image, a fixed migration result image will be obtained, without supporting that the user controls the migration effect in the migration result image, to migrate the face makeup of the reference image to the face in the target image to some extent.

SUMMARY

In view of this, embodiments of the present disclosure provide an image processing method and apparatus, for solving the problem of not supporting the user to control the migration effect, based on the image feature migration mode in the related art.

In order to achieve the above objective, the embodiments of the present disclosure provide the following technical solutions:

In a first aspect, embodiments of the present disclosure provide an image processing method, comprising:

obtaining a target feature and a reference feature, the target feature is a feature obtained by performing feature extraction on a target object in a target image, and the reference feature is a feature obtained by performing feature extraction on a reference object in a reference image;

obtaining a migration matrix, the migration matrix is used for controlling the reference feature to be fused with the target feature at a designated weight;

fusing the target feature and the reference feature according to the migration matrix to obtain a fused feature; and generating a migration result image according to the fused feature and the target image.

As an alternative implementation of the embodiments of the present disclosure, the obtaining the target feature and the reference feature comprises:

obtaining a first area and a second area, the first area is an area corresponding to the target object in the target image, the second area is an area corresponding to the reference object in the reference image;

performing feature extraction on the target image according to the first area to obtain the target feature; and performing feature extraction on the reference image according to the second area to obtain the reference feature.

As an alternative implementation of the embodiments of the present disclosure, the obtaining the first area and the second area comprises:

obtaining a first gray scale image and a second gray scale image, wherein pixel points in the first gray scale image are in one-to-one correspondence with pixel points in the target image through pixel coordinates, a gray-scale value of a pixel point in the first gray scale image corresponding to a pixel point in the first area is a first gray-scale value, and a gray-scale value of a pixel point in the first gray scale image corresponding to a pixel point outside the first area is a second gray-scale value; and pixel points in the second gray scale image are in one-to-one correspondence with pixel points in the reference image through pixel coordinates, a gray-scale value of a pixel point in the second gray scale image corresponding to a pixel point in the second area is the first gray-scale value, and a gray-scale value of a pixel point in the second gray scale image corresponding to a pixel point outside the second area is the second gray-scale value.

As an alternative implementation of the embodiments of the present disclosure, the performing feature extraction on the target image according to the first area to obtain the target feature comprises:

inputting the target image and the first gray scale image into a feature extraction model, and obtaining an output of the feature extraction model as the target feature, wherein the feature extraction model is a model obtained by training a first network model based on first sample data, the first sample data comprising: a sample image, a sample feature, and a sample gray scale image, the sample feature is a feature obtained by performing feature extraction on a sample object in the sample image, and the sample gray scale image is used for characterizing an area corresponding to the sample object in the sample image.

As an alternative implementation of the embodiments of the present disclosure, the performing feature extraction on the reference image according to the second area to obtain the reference feature comprises:

inputting the reference image and the second gray scale image into a feature extraction model, and obtaining an output of the feature extraction model as the reference feature, wherein the feature extraction model is a model obtained by training a first network model based on first sample data, the first sample data comprising: a sample image, a sample feature, and a sample gray scale image, the sample feature is a feature obtained by performing feature extraction on a sample object in the sample image, and the sample gray scale image is used for characterizing an area corresponding to the sample object in the sample image.

As an alternative implementation of the embodiments of the present disclosure, the obtaining the migration matrix comprises:

obtaining a weight parameter, the weight parameter is used for characterizing the designated weight; and obtaining the migration matrix according to the weight parameter and a pre-trained matrix, wherein the pre-trained matrix is a matrix obtained by training a preset matrix based on second sample data, the second sample data comprising: a first sample feature, a second sample feature, and a sample fusion feature corresponding to the first sample feature and the second sample feature.

As an alternative implementation of the embodiments of the present disclosure, the obtaining the weight parameter comprises:

displaying a first interface, the first interface comprising an input control for inputting the weight parameter; and in response to an operation of a user on the input control, obtaining the weight parameter.

As an alternative implementation of the embodiments of the present disclosure, the generating the migration result image according to the fused feature and the target image comprises:

inputting the fused feature and the target image into a feature fusion model, and obtaining an output of the feature fusion model as the migration result image, wherein the feature fusion model is a model obtained by training a second network model based on third sample data, the third sample data comprising: a sample image, a sample fusion feature, and a sample migration result image corresponding to the sample image and the sample fusion feature.

As an alternative implementation of the embodiments of the present disclosure, the target feature is a face feature obtained by performing feature extraction on a face to be made up in the target image, and the reference feature is a makeup feature obtained by performing feature extraction on makeup to be migrated in the reference image.

In a second aspect, embodiments of the present disclosure provide an image processing apparatus, comprising:

a first obtaining unit configured to obtain a target feature and a reference feature, the target feature is a feature obtained by performing feature extraction on a target object in a target image, and the reference feature is a feature obtained by performing feature extraction on a reference object in a reference image;

a second obtaining unit configured to obtain a migration matrix, the migration matrix is used for controlling the reference feature to be fused with the target feature at a designated weight; a processing unit configured to fuse the target feature and the reference feature according to the migration matrix to obtain a fused feature; and a generating unit configured to generate a migration result image according to the fused feature and the target image.

As an alternative implementation of the embodiments of the present disclosure, the first obtaining unit is specifically configured to obtain a first area and a second area, the first area is an area corresponding to the target object in the target image, and the second area is an area corresponding to the reference object in the reference image; perform feature extraction on the target image according to the first area to obtain the target feature; and perform feature extraction on the reference image according to the second area to obtain the reference feature.

As an alternative implementation of the embodiments of the present disclosure, the first obtaining unit is specifically configured to obtain a first gray scale image and a second gray scale image, wherein pixel points in the first gray scale image are in one-to-one correspondence with pixel points in the target image through pixel coordinates, a gray-scale value of a pixel point in the first gray scale image corresponding to a pixel point in the first area is a first gray-scale value, and a gray-scale value of a pixel point in the first gray scale image corresponding to a pixel point outside the first area is a second gray-scale value; and pixel points in the second gray scale image are in one-to-one correspondence with pixel points in the reference image through pixel coordinates, a gray-scale value of a pixel point in the second gray scale image corresponding to a pixel point in the second area is the first gray-scale value, and a gray-scale value of a pixel point in the second gray scale image corresponding to a pixel point outside the second area is the second gray-scale value.

As an alternative implementation of the embodiments of the present disclosure, the first obtaining unit is specifically configured to input the target image and the first gray scale image into a feature extraction model, and obtain an output of the feature extraction model as the target feature, wherein the feature extraction model is a model obtained by training a first network model based on first sample data, the first sample data comprising: a sample image, a sample feature, and a sample gray scale image, the sample feature is a feature obtained by performing feature extraction on a sample object in the sample image, and the sample gray scale image is used for characterizing an area corresponding to the sample object in the sample image.

As an alternative implementation of the embodiments of the present disclosure, the first obtaining unit is specifically configured to input the reference image and the second gray scale image into a feature extraction model, and obtain an output of the feature extraction model as the reference feature, wherein the feature extraction model is a model obtained by training a first network model based on first sample data, the first sample data comprising: a sample image, a sample feature, and a sample gray scale image, the sample feature is a feature obtained by performing feature extraction on a sample object in the sample image, and the sample gray scale image is used for characterizing an area corresponding to the sample object in the sample image.

As an alternative implementation of the embodiments of the present disclosure, the second obtaining unit is specifically configured to obtain a weight parameter; and obtain the migration matrix according to the weight parameter and a pre-trained matrix, wherein the weight parameter is used for characterizing the designated weight, and the pre-trained matrix is a matrix obtained by training a preset matrix based on second sample data, the second sample data comprising: a first sample feature, a second sample feature, and a sample fusion feature corresponding to the first sample feature and the second sample feature.

As an alternative implementation of the embodiments of the present disclosure, the second obtaining unit is specifically configured to display a first interface, the first interface comprising an input control for inputting the weight parameter; and in response to an operation of a user on the input control, obtain the weight parameter.

As an alternative implementation of the embodiments of the present disclosure, the generating unit is specifically configured to input the fused feature and the target image into a feature fusion model, and obtain an output of the feature fusion model as the migration result image, wherein the feature fusion model is a model obtained by training a second network model based on third sample data, the third sample data comprising: a sample image, a sample fusion feature, and a sample migration result image corresponding to the sample image and the sample fusion feature.

As an alternative implementation of the embodiments of the present disclosure, the target feature is a face feature obtained by performing feature extraction on a face to be made up in the target image, and the reference feature is a makeup feature obtained by performing feature extraction on makeup to be migrated in the reference image.

In a third aspect, embodiments of the present disclosure provide an electronic device, comprising: a memory and a processor, the memory is configured to store a computer program, and the processor is configured to, when calling the computer program, cause the electronic device to implement the image processing method according to any of the above embodiments.

In a fourth aspect, the present disclosure provides a non-transitory computer-readable storage medium having a computer program stored thereon, wherein the computer program, when executed by a computing device, causes the computing device to implement the image processing method according to any of the above embodiments.

In a fifth aspect, embodiments of the present disclosure provide a computer program product which, when running on a computer, causes the computer to implement the image processing method according to any of the above embodiments.

BRIEF DESCRIPTION OF THE DRAWINGS

The accompanying drawings here, which are incorporated in this description and constitute a part thereof, illustrate embodiments consistent with the present disclosure and, together with the description, serve to explain the principles of the present disclosure.

In order to more clearly illustrate technical solutions in the embodiments of the present disclosure or in the related art, the drawings to be used in the description of the embodiments or related art will be briefly described below.

Obviously, for those of ordinary skill in the art, they may also obtain other drawings from the drawings without paying out creative efforts.

Figure 1:
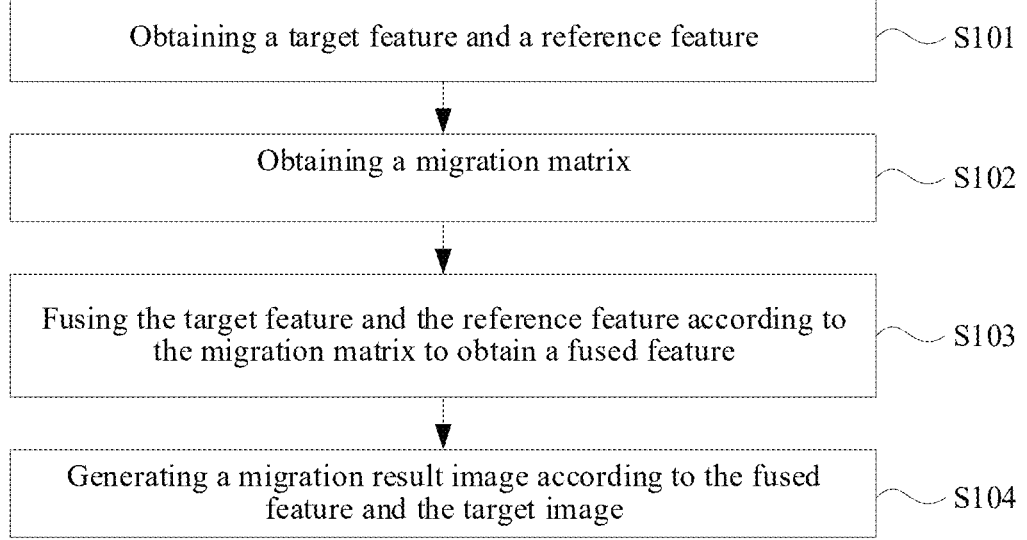
Figure 2:
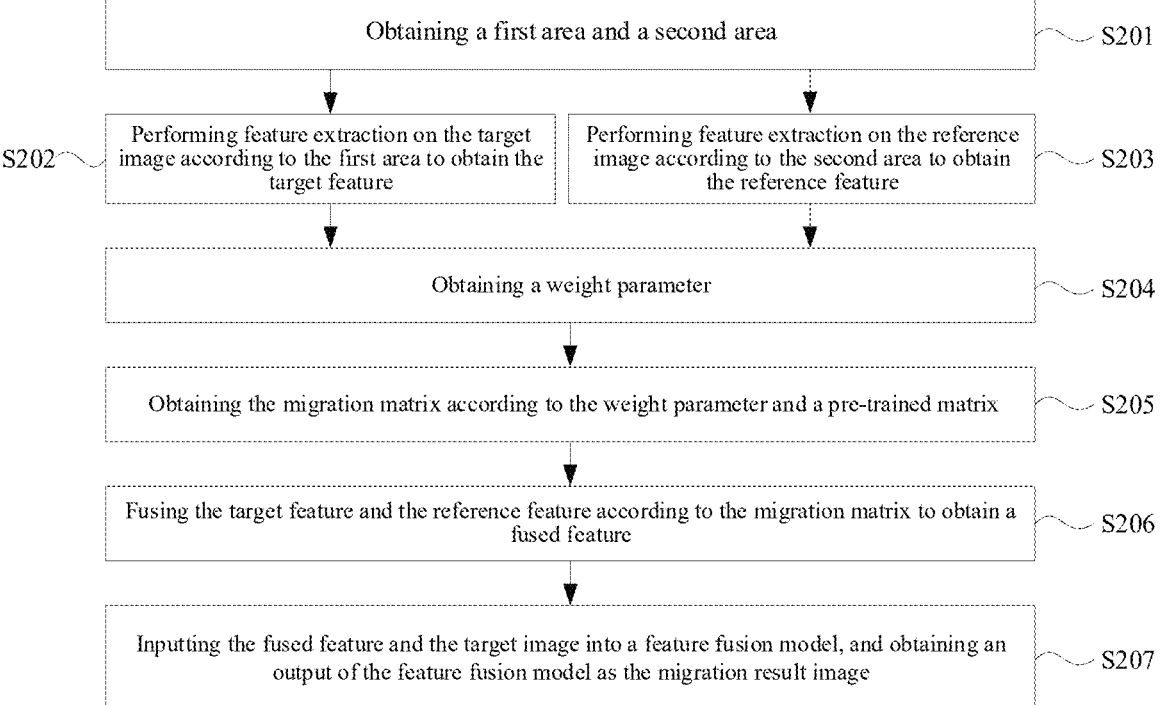
Figure 3:
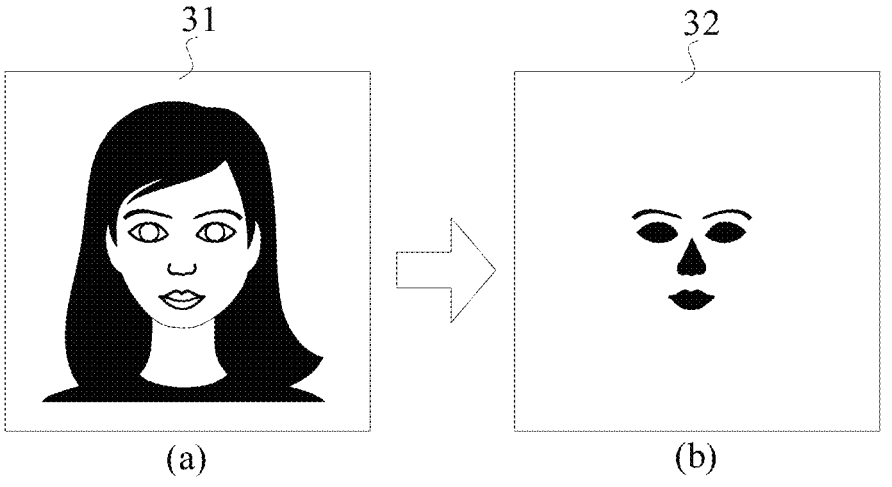
Figure 4:
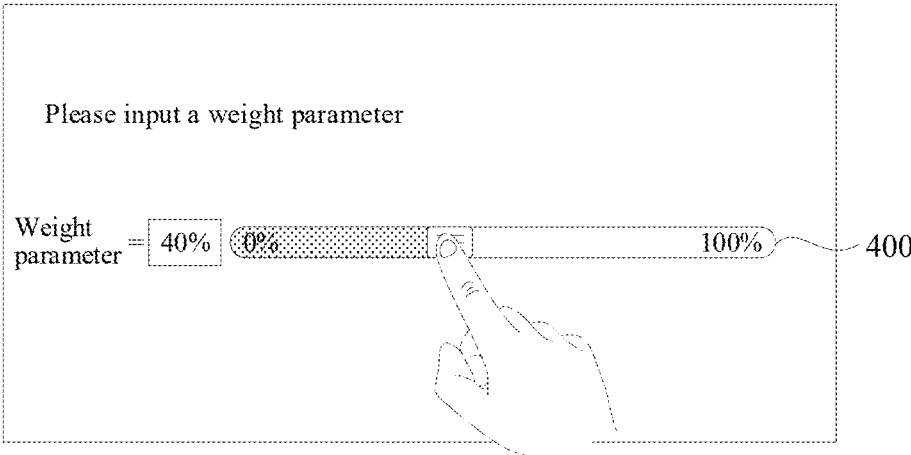
Figure 5:
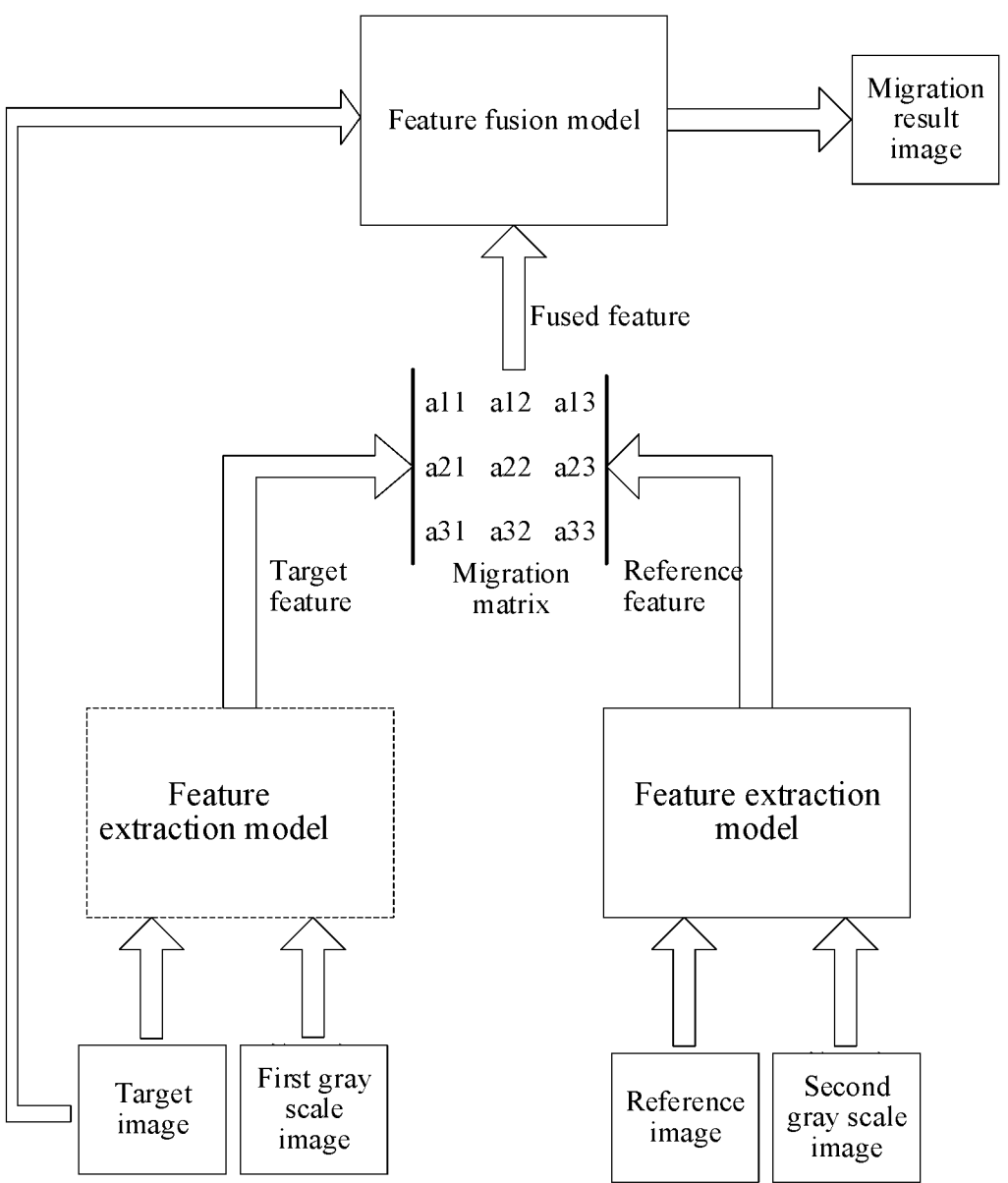
Figure 6:
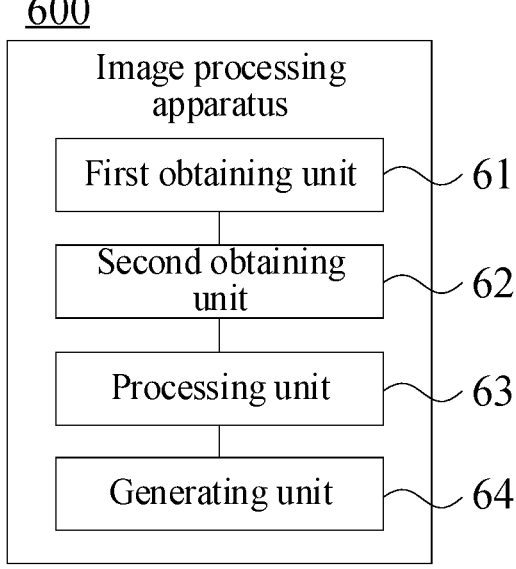
Figure 7:
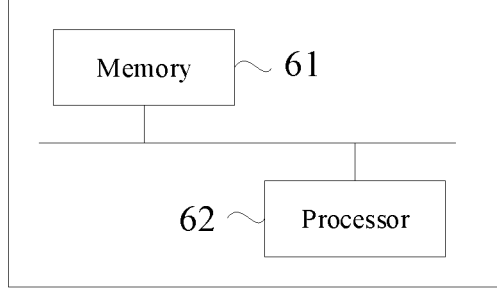

FIG. 1 is a flow diagram of steps of an image processing method provided in an embodiment of the present disclosure;

FIG. 2 is another flow diagram of steps of an image processing method provided in an embodiment of the present disclosure;

FIG. 3 is a schematic diagram of a scenario architecture of an image processing method provided in an embodiment of the present disclosure;

FIG. 4 is another schematic diagram of a scenario architecture of an image processing method provided in an embodiment of the present disclosure;

FIG. 5 is a schematic diagram of an image processing apparatus provided in an embodiment of the present disclosure;

FIG. 6 is a schematic diagram of another image processing apparatus provided in an embodiment of the present disclosure;

FIG. 7 is a schematic diagram of a hardware structure of an electronic device provided in an embodiment of the present disclosure.

DETAILED DESCRIPTION

In order to more clearly understand the above objectives, features and advantages of the present disclosure, solutions of the present disclosure will be further described below. It should be noted that, the embodiments of the present disclosure and features in the embodiments may be combined with each other without conflict.

In the following description, numerous specific details are set forth to facilitate thorough understanding of the present disclosure, but the present disclosure may also be practiced in other ways different from those described here; and it is obvious that the embodiments in this description are only some of the embodiments of the present disclosure, rather than all of the embodiments.

In the embodiments of the present disclosure, words such as "exemplary" or "for example" are used for expressing an example, instance, or illustration. Any embodiment or design solution described as "exemplary" or "for example" in the embodiments of the present disclosure should not be construed as being more preferred or advantageous over other embodiments or design solutions. Rather, use of the word such as "exemplary" or "for example" is intended to present relevant concepts in a specific way. Furthermore, in the description of the embodiments of the present disclosure, "a plurality" means two or more unless otherwise specified.

In an image processing method provided in embodiments of the present disclosure, firstly, feature extraction is performed on a target object in a target image and a reference object in a reference image to obtain a target feature and a reference feature, then a migration matrix capable of controlling the reference feature to be fused with the target feature at a designated weight is obtained, then the target feature and the reference feature are fused according to the migration matrix to obtain a fused feature, and finally a migration result image is generated according to the fused feature and the target image. Since the image processing method provided in the embodiments of the present disclosure can obtain the target feature and the reference feature, and fuse the target feature and the reference feature according to the migration matrix, and the migration matrix is capable of controlling the reference feature to be fused with the target feature at the designated weight, the embodiments of the present disclosure, by obtaining different migration matrices, can control the weight of the reference feature in fusing the target feature and the reference thereby controlling an intensity of the reference feature acting on the fused feature, so as to control the migration effect of the migration result image, therefore, the embodiments of the present disclosure can support the user to control the migration effect, so as to solve the problem that the user cannot control the migration effect.

Based on the above content, some embodiments of the present disclosure provide an image processing method, as shown in FIG. 1, and according to some embodiments of the present disclosure, the image processing method comprises the following steps:

S101, obtaining a target feature and a reference feature.

The target feature is a feature obtained by performing feature extraction on a target object in a target image, and the reference feature is a feature obtained by performing feature extraction on a reference object in a reference image.

In some embodiments, an implementation of the obtaining the target feature in the above step S101 may comprise the following steps a to c:

Step a, obtaining the target image.

Step b, determining the target object in the target image.

Exemplarily, the target object may be automatically obtained based on an image recognition algorithm, or the target image may be displayed, to receive a selection operation inputted by a user on the target object, and based on the selection operation inputted by the user on the target object, the target object is determined.

Step c, performing feature extraction on the target object in the target image to obtain the target feature.

In some embodiments, an implementation of the obtaining the reference feature in the above step S101 may comprise the following steps 1 to 3:

Step 1, obtaining the reference image.

Step 2, determining the reference object in the reference image.

Similarly, the reference object may be automatically obtained based on an image recognition algorithm, or the reference image may be displayed, to receive a selection operation inputted by the user on the reference object, and based on the selection operation inputted by the user on the reference object, the reference object is determined.

Step 3, performing feature extraction on the reference object in the reference image to obtain the reference feature.

In some embodiments, the target feature is a face feature obtained by performing feature extraction on a face to be made up in the target image, and the reference feature is a makeup feature obtained by performing feature extraction on makeup to be migrated in the reference image.

S102, obtaining a migration matrix.

The migration matrix is used for controlling the reference feature to be fused with the target feature at a designated weight.

Exemplarily, the designated weight may be 100%, 50%, 30%, and the like, which is not limited in the embodiments of the present disclosure. In actual use, the user may set the designated weight as needed.

S103, fusing the target feature and the reference feature according to the migration matrix to obtain a fused feature.

S104, generating a migration result image according to the fused feature and the target image.

Exemplarily, an implementation of the above step S104 (generating the migration result image according to the fused feature and the target image) may be: obtaining an image corresponding to the fused feature, and overlaying the image corresponding to the fused feature on the target object in the target image to generate the migration result image.

In an image processing method provided in the embodiments of the present disclosure, firstly, feature extraction is performed on a target object in a target image and a reference object in a reference image to obtain a target feature and a reference feature, then a migration matrix capable of controlling the reference feature to be fused with the target feature at a designated weight is obtained, then the target feature and the reference feature are fused according to the migration matrix to obtain a fused feature, and finally a migration result image is generated according to the fused feature and the target image. Since the image processing method provided in the embodiments of the present disclosure can obtain the target feature and the reference feature, and fuse the target feature and the reference feature according to the migration matrix, and the migration matrix is capable of controlling the reference feature to be fused with the target feature at the designated weight, the embodiments of the present disclosure, by obtaining different migration matrices, can control the weight of the reference feature in fusing the target feature and the reference feature, thereby controlling an intensity of the reference feature acting on the fused feature, so as to control the migration effect of the migration result image, therefore, the embodiments of the present disclosure can support the user to control the migration effect, so as to solve the problem that the user cannot control the migration effect.

As an extension and refinement of the above embodiments, embodiments of the present provide another image processing method, as shown in FIG. 2, further comprising the following steps:

S201, obtaining a first area and a second area.

The first area is an area corresponding to the target object in the target image, and the second area is an area corresponding to the reference object in the reference image.

Specifically, when the target feature is a face feature obtained by performing feature extraction on a face to be made up in the target image, and the reference feature is a makeup feature obtained by performing feature extraction on makeup to be migrated in the reference image, the first area is an area corresponding to five sense organs of the face to be made up in the target image, and the second area is an area corresponding to five sense organs of a face to which the makeup to be migrated belongs in the reference image.

In some embodiments, the above step S201 (obtaining the first area and the second area) comprises:

obtaining a first gray scale image and a second gray scale image.

Pixel points in the first gray scale image are in one-to-one correspondence with pixel points in the target image through pixel coordinates, a gray-scale value of a pixel point in the first gray scale image corresponding to a pixel point in the first area is a first gray-scale value, and a gray-scale value of a pixel point in the first gray scale image corresponding to a pixel point outside the first area is a second gray-scale value; and pixel points in the second gray scale image are in one-to-one correspondence with pixel points in the reference image through pixel coordinates, a gray-scale value of a pixel point in the second gray scale image corresponding to a pixel point in the second area is the first gray-scale value, and a gray-scale value of a pixel point in the second gray scale image corresponding to a pixel point outside the second area is the second gray-scale value.

Exemplarily, reference is made to FIG. 3, in which an example that a target object is five sense organs of a face in a target image is shown. As shown in (a) of FIG. 3, if the target object is five sense organs of a face in a target image 31, a gray scale image corresponding to the target image 31 is as shown in (b) of FIG. 3; pixel points in a gray scale image 32 are in one-to-one correspondence with pixel points in the target image 31 through pixel coordinates, a gray-scale value of a pixel point in the gray scale image 32 corresponding to a pixel point in an area where the five sense organs of the face in the target image 31 are located is 255, and a gray-scale value of a pixel point in the gray scale image 32 corresponding to a pixel point outside the area where the five sense organs of the face in the target image 31 are located is 0.

S202, performing feature extraction on the target image according to the first area to obtain the target feature.

As an alternative implementation of the embodiments of the present disclosure, in a case where the area corresponding to the target object in the target image is represented by the first gray scale image, an implementation of the above step S202 (performing feature extraction on the target image according to the first area to obtain the target feature) may comprise:

inputting the target image and the first gray scale image into a feature extraction model, and obtaining an output of the feature extraction model as the target feature.

The feature extraction model is a model obtained by training a first network model based on first sample data, the first sample data comprising: a sample image, a sample feature, and a sample gray scale image, the sample feature is a feature obtained by performing feature extraction on a sample object in the sample image, and the sample gray scale image is used for characterizing an area corresponding to the sample object in the sample image.

S203, performing feature extraction on the reference image according to the second area to obtain the reference feature.

It should be noted that, in the embodiments of the present disclosure, the sequence of executing the above steps S202 and S203 is not limited, that is, the step S202 may be executed first, and then the step S203 is executed, or the step S203 may be executed first, and then the step S202 is executed, or the step S202 and the step S203 may be executed at the same time.

As an alternative implementation of the embodiments of the present disclosure, in the case where the area corresponding to the reference object in the reference image is represented by the second gray scale image, an implementation of the above step S203 (performing feature extraction on the reference image according to the second area to obtain the reference feature) may comprise:

inputting the reference image and the second gray scale image into a feature extraction model, and obtaining an output of the feature extraction model as the reference feature,
wherein the feature extraction model is a model obtained by training a first network model based on first sample data, the first sample data comprising: a sample image, a sample feature, and a sample gray scale image, the sample feature is a feature obtained by performing feature extraction on a sample object in the sample image, and the sample gray scale image is used for characterizing an area corresponding to the sample object in the sample image.

According to the above embodiment, when the target feature and the reference feature are extracted, the area corresponding to the target object in the target image and the area corresponding to the reference object in the reference image are obtained first, and then feature extraction is performed on the target image according to the first area to obtain the target feature, and feature extraction is performed on the reference image according to the second area to obtain the reference feature, therefore, according to the above embodiment, the target feature and the reference feature can be accurately extracted, which avoids a mismatch between actually extracted features and hopefully extracted features that is caused by a morphological difference between the target object and the reference object, and further improves robustness of the image processing method provided in the embodiments of the present disclosure.

S204, obtaining a weight parameter.

The weight parameter is used for characterizing the designated weight.

In some embodiments, an implementation of the step S204 (obtaining the weight parameter) may comprise the following steps:

Step I, displaying a first interface, the first interface comprising an input control for inputting the weight parameter;

Step II, in response to an operation of the user on the input control, obtaining the weight parameter.

Exemplarily, referring to FIG. 4, the displaying first interface comprises a prompt of "please input a weight parameter" and an input control 400 for inputting the weight parameter, and the user can input the weight parameter by dragging a slider in the input control 400.

S205, obtaining the migration matrix according to the weight parameter and a pre-trained matrix.

The pre-trained matrix is a matrix obtained by training a preset matrix based on second sample data, the second sample data comprising: a first sample feature, a second sample feature, and a sample fusion feature corresponding to the first sample feature and the second sample feature.

Exemplarily, in the training of the pre-trained matrix, the sample fusion feature in the sample data used may be a feature obtained by fusing the second sample feature with the first sample feature at a weight of 100%.

S206, fusing the target feature and the reference feature according to the migration matrix to obtain a fused feature.

S207, inputting the fused feature and the target image into a feature fusion model, and obtaining an output of the feature fusion model as the migration result image.

The feature fusion model is a model obtained by training a second network model based on third sample data, the third sample data comprising: a sample image, a sample fusion feature, and a sample migration result image corresponding to the sample image and the sample fusion feature.

Further, referring to FIG. 5, on the basis of the image processing method shown in FIG. 2, a flow of steps of an image processing method provided in the embodiments of the present disclosure comprises:

inputting a target image and a first gray scale image into a feature extraction model to obtain a target feature;

inputting a reference image and a second gray scale image into a feature extraction model to obtain a reference feature;

fusing the target feature and the reference feature based on a migration matrix to obtain a fused feature; and inputting the target image and the fused feature into a feature fusion model to obtain a migration result image.

Based on the same inventive concept, as an implementation of the above method, embodiments of the present disclosure further provide an image processing apparatus, wherein the apparatus embodiment corresponds to the foregoing method embodiment, and for convenience of reading, details in the foregoing method embodiment are not repeated one by one in the apparatus embodiment, but it should be clear that the image processing apparatus in this embodiment can correspondingly implement all the contents in the foregoing method embodiment.

Embodiments of the present disclosure provide an image processing apparatus. FIG. 6 is a schematic structural diagram of the image processing apparatus, and as shown in FIG. 6, the image processing apparatus 600 comprises:

a first obtaining unit 61 configured to obtain a target feature and a reference feature, the target feature is a feature obtained by performing feature extraction on a target object in a target image, and the reference feature is a feature obtained by performing feature extraction on a reference object in a reference image;

a second obtaining unit 62 configured to obtain a migration matrix, the migration matrix is used for controlling the reference feature to be fused with the target feature at a designated weight;

a processing unit 63 configured to fuse the target feature and the reference feature according to the migration matrix to obtain a fused feature; and a generating unit 64 configured to generate a migration result image according to the fused feature and the target image.

As an alternative implementation of the embodiments of the present disclosure, the first obtaining unit 61 is specifically configured to obtain a first area and a second area, the first area is an area corresponding to the target object in the target image, and the second area is an area corresponding to t the reference object in the reference image; perform feature extraction on the target image according to the first area to obtain the target feature; and perform feature extraction on the reference image according to the second area to obtain the reference feature.

As an alternative implementation of the embodiments of the present disclosure, the first obtaining unit 61 is specifically configured to obtain a first gray scale image and a second gray scale image, wherein pixel points in the first gray scale image are in one-to-one correspondence with pixel points in the target image through pixel coordinates, a gray-scale value of a pixel point in the first gray scale image corresponding to a pixel point in the first area is a first gray-scale value, and a gray-scale value of a pixel point in the first gray scale image corresponding to a pixel point outside the first area is a second gray-scale value; and pixel points in the second gray scale image are in one-to-one correspondence with pixel points in the reference image through pixel coordinates, a gray-scale value of a pixel point in the second gray scale image corresponding to a pixel point in the second area is the first gray-scale value, and a gray-scale value of a pixel point in the second gray scale image corresponding to a pixel point outside the second area is the second gray-scale value.

As an alternative implementation of the embodiments of the present disclosure, the first obtaining unit 61 is specifically configured to input the target image and the first gray scale image into a feature extraction model, and obtain an output of the feature extraction model as the target feature, wherein the feature extraction model is a model obtained by training a first network model based on first sample data, the first sample data comprising: a sample image, a sample feature, and a sample gray scale image, the sample feature is a feature obtained by performing feature extraction on a sample object in the sample image, and the sample gray scale image is used for characterizing an area corresponding to the sample object in the sample image.

As an alternative implementation of the embodiments of the present disclosure, the first obtaining unit 61 is specifically configured to input the reference image and the second gray scale image into a feature extraction model, and obtain an output of the feature extraction model as the reference feature, wherein the feature extraction model is a model obtained by training a first network model based on first sample data, the first sample data comprising: a sample image, a sample feature, and a sample gray scale image, the sample feature is a feature obtained by performing feature extraction on a sample object in the sample image, and the sample gray scale image is used for characterizing an area corresponding to the sample object in the sample image.

As an alternative implementation of the embodiments of the present disclosure, the second obtaining unit 62 is specifically configured to obtain a weight parameter; and obtain the migration matrix according to the weight parameter and a pre-trained matrix;

wherein the weight parameter is used for characterizing the designated weight, and the pre-trained matrix is a matrix obtained by training a preset matrix based on second sample data, the second sample data comprising: a first sample feature, a second sample feature, and a sample fusion feature corresponding to the first sample feature and the second sample feature.

As an alternative implementation of the embodiments of the present disclosure, the second obtaining unit 62 is specifically configured to display a first interface, the first interface comprising an input control for inputting the weight parameter; and in response to an operation of a user on the input control, obtaining the weight parameter.

As an alternative implementation of the embodiments of the present disclosure, the generating unit 64 is specifically configured to input the fused feature and the target image into a feature fusion model, and obtain an output of the feature fusion model as the migration result image, wherein the feature fusion model is a model obtained by training a second network model based on third sample data, the third sample data comprising: a sample image, a sample fusion feature, and a sample migration result image corresponding to the sample image and the sample fusion feature.

As an alternative implementation of the embodiments of the present disclosure, the target feature is a face feature obtained by performing feature extraction on a face to be made up in the target image, and the reference feature is a makeup feature obtained by performing feature extraction on makeup to be migrated in the reference image.

The image processing apparatus provided in the embodiments can perform the image processing method provided in the above method embodiments, and has implementation principles and technical effects similar to those of the method, which are not repeated here.

Based on the same inventive concept, embodiments of the present disclosure further provide an electronic device. FIG. 6 is a schematic structural diagram of an electronic device provided in embodiments of the present disclosure, and as shown in FIG. 6, the electronic device provided in the embodiments comprises: a memory 61 and a processor 62, the memory 61 is configured to store a computer program, and the processor 62 is configured to, when calling the computer program, cause the electronic device to implement the image processing method provided in the above embodiments.

Embodiments of the present disclosure further provide a computer-readable storage medium having a computer program stored thereon, wherein the computer program, when executed by a computing device, causes the computing device to implement the image processing method provided in the above embodiments.

Embodiments of the present disclosure further provide a computer program product, which when running on a computer, causes the computer to implement the image processing method provided in the above embodiments.

It should be appreciated by those skilled in the art that, the embodiments of the present disclosure may be provided as a method, system, or computer program product. Accordingly, the present disclosure may take a form of an entire hardware embodiment, an entire software embodiment, or an embodiment combining software and hardware aspects. Furthermore, the present disclosure may take a form of a computer program product implemented on one or more computer-usable storage media having computer-usable program code embodied therein.

The processor may be a central processing unit (CPU), or other general-purpose processor, digital signal processor (DSP), application specific integrated circuit (ASIC), field-programmable gate array (FPGA) or other programmable logic devices, a discrete gate or transistor logic device, a discrete hardware component, etc. The general-purpose processor may be a microprocessor or any conventional processor, etc.

The memory might include a non-permanent memory, random access memory (RAM) and/or non-volatile memory, etc. in a computer-readable medium, such as a read-only memory (ROM) or flash memory (flash RAM). The memory is an example of the computer-readable medium.

The computer-readable medium includes permanent and non-permanent, removable and non-removable storage media. For the storage medium, storage of information may be implemented by any method or technique, wherein the information may be computer-readable instructions, data structures, program's modules or other data. An example of the computer storage medium includes, but is not limited to, a phase-change memory (PRAM), a static random access memory (SRAM), a dynamic random access memory (DRAM), another type of random access memory (RAM), read-only memory (ROM), electrically erasable programmable read-only memory (EEPROM), flash memory or other memory technology, a compact disc read-only memory (CD-ROM), a digital versatile disk (DVD), or other optical storage, magnetic cassette, magnetic disk storage or other magnetic storage devices, or any other non-transmission medium, which can be used for storing information that can be accessed by a computing device. According to the definition herein, the computer-readable medium does not include transitory media such as modulated data signals and carriers.

Finally, it should be noted that: the above embodiments are only used for illustrating the technical solutions of the present disclosure, rather than limiting them; although the present disclosure has been described in detail with reference to the foregoing embodiments, those of ordinary skill in the art should understand that: they may still make modifications to the technical solutions recited in the foregoing embodiments, or make equivalent replacements to some or all of the technical features thereof; and these modifications or replacements do not make the essence of the corresponding technical solutions depart from the scope of the technical solutions of the embodiments of the present disclosure.

What is claimed is:

1. An image processing method, comprising:

obtaining a target feature and a reference feature, wherein the target feature is a feature obtained by performing feature extraction on a target object in a target image, and the reference feature is a feature obtained by performing feature extraction on a reference object in a reference image;

obtaining a migration matrix, wherein the migration matrix is used for controlling the reference feature to be fused with the target feature at a designated weight;

fusing the target feature and the reference feature according to the migration matrix to obtain a fused feature; and generating a migration result image according to the fused feature and the target image, wherein the obtaining the migration matrix comprises:

obtaining a weight parameter, wherein the weight parameter is used for characterizing the designated weight; and obtaining the migration matrix according to the weight parameter and a pre-trained matrix, wherein the pre-trained matrix is a matrix obtained by training a preset matrix based on first sample data, the first sample data comprising: a first sample feature, a second sample feature, and a sample fusion feature corresponding to the first sample feature and the second sample feature.

2. The method according to claim 1, wherein the obtaining the target feature and the reference feature comprises:

obtaining a first area and a second area, wherein the first area is an area corresponding to the target object in the target image, the second area is an area corresponding to the reference object in the reference image;

performing feature extraction on the target image according to the first area to obtain the target feature; and performing feature extraction on the reference image according to the second area to obtain the reference feature.

3. The method according to claim 2, wherein the obtaining the first area and the second area comprises:

obtaining a first gray scale image and a second gray scale image, wherein pixel points in the first gray scale image are in one-to-one correspondence with pixel points in the target image through pixel coordinates, a gray-scale value of a pixel point in the first gray scale image corresponding to a pixel point in the first area is a first gray-scale value, and a gray-scale value of a pixel point in the first gray scale image corresponding to a pixel point outside the first area is a second gray-scale value; and pixel points in the second gray scale image are in one-to-one correspondence with pixel points in the reference image through pixel coordinates, a gray-scale value of a pixel point in the second gray scale image corresponding to a pixel point in the second area is the first gray-scale value, and a gray-scale value of a pixel point in the second gray scale image corresponding to a pixel point outside the second area is the second gray-scale value.

4. The method according to claim 3, wherein the performing feature extraction on the target image according to the first area to obtain the target feature comprises:

inputting the target image and the first gray scale image into a feature extraction model, and obtaining an output of the feature extraction model as the target feature, wherein the feature extraction model is a model obtained by training a first network model based on second sample data, the second sample data comprising: a sample image, a sample feature, and a sample gray scale image, wherein the sample feature is a feature obtained by performing feature extraction on a sample object in the sample image, and the sample gray scale image is used for characterizing an area corresponding to the sample object in the sample image.

5. The method according to claim 3, wherein the performing feature extraction on the reference image according to the second area to obtain the reference feature comprises:

inputting the reference image and the second gray scale image into a feature extraction model, and obtaining an output of the feature extraction model as the reference feature, wherein the feature extraction model is a model obtained by training a first network model based on second sample data, the second sample data comprising: a sample image, a sample feature, and a sample gray scale image, wherein the sample feature is a feature obtained by performing feature extraction on a sample object in the sample image, and the sample gray scale image is used for characterizing an area corresponding to the sample object in the sample image.

6. The method according to claim 1, wherein the obtaining the weight parameter comprises:

displaying a first interface, the first interface comprising an input control for inputting the weight parameter; and in response to an operation of a user on the input control, obtaining the weight parameter.

7. The method according to claim 1, wherein the generating the migration result image according to the fused feature and the target image comprises:

inputting the fused feature and the target image into a feature fusion model, and obtaining an output of the feature fusion model as the migration result image, wherein the feature fusion model is a model obtained by training a second network model based on third sample data, the third sample data comprising: a sample image, a sample fusion feature, and a sample migration result image corresponding to the sample image and the sample fusion feature.

8. The method according to claim 1, wherein the target feature is a face feature obtained by performing feature extraction on a face to be made up in the target image, and the reference feature is a makeup feature obtained by performing feature extraction on makeup to be migrated in the reference image.

9. An electronic device, comprising: a memory and a processor, wherein the memory is configured to store a computer program, and the processor is configured to, when calling the computer program, cause the electronic device to:

obtain a target feature and a reference feature, wherein the target feature is a feature obtained by performing feature extraction on a target object in a target image, and the reference feature is a feature obtained by performing feature extraction on a reference object in a reference image;

obtain a migration matrix, wherein the migration matrix is used for controlling the reference feature to be fused with the target feature at a designated weight;

fuse the target feature and the reference feature according to the migration matrix to obtain a fused feature; and generate a migration result image according to the fused feature and the target image, wherein the obtaining the migration matrix comprises:

obtaining a weight parameter, wherein the weight parameter is used for characterizing the designated weight; and obtaining the migration matrix according to the weight parameter and a pre-trained matrix, wherein the pre-trained matrix is a matrix obtained by training a preset matrix based on first sample data, the first sample data comprising: a first sample feature, a second sample feature, and a sample fusion feature corresponding to the first sample feature and the second sample feature.

10. The electronic device according to claim 9, wherein the obtaining the target feature and the reference feature comprises:

obtaining a first area and a second area, wherein the first area is an area corresponding to the target object in the target image, the second area is an area corresponding to the reference object in the reference image;

performing feature extraction on the target image according to the first area to obtain the target feature; and performing feature extraction on the reference image according to the second area to obtain the reference feature.

11. The electronic device according to claim 10, wherein the obtaining the first area and the second area comprises:

obtaining a first gray scale image and a second gray scale image, wherein pixel points in the first gray scale image are in one-to-one correspondence with pixel points in the target image through pixel coordinates, a gray-scale value of a pixel point in the first gray scale image corresponding to a pixel point in the first area is a first gray-scale value, and a gray-scale value of a pixel point in the first gray scale image corresponding to a pixel point outside the first area is a second gray-scale value; and pixel points in the second gray scale image are in one-to-one correspondence with pixel points in the reference image through pixel coordinates, a gray-scale value of a pixel point in the second gray scale image corresponding to a pixel point in the second area is the first gray-scale value, and a gray-scale value of a pixel point in the second gray scale image corresponding to a pixel point outside the second area is the second gray-scale value.

12. The electronic device according to claim 11, wherein the performing feature extraction on the target image according to the first area to obtain the target feature comprises:

inputting the target image and the first gray scale image into a feature extraction model, and obtaining an output of the feature extraction model as the target feature, wherein the feature extraction model is a model obtained by training a first network model based on second sample data, the second sample data comprising: a sample image, a sample feature, and a sample gray scale image, wherein the sample feature is a feature obtained by performing feature extraction on a sample object in the sample image, and the sample gray scale image is used for characterizing an area corresponding to the sample object in the sample image.

13. The electronic device according to claim 11, wherein the performing feature extraction on the reference image according to the second area to obtain the reference feature comprises:

inputting the reference image and the second gray scale image into a feature extraction model, and obtaining an output of the feature extraction model as the reference feature, wherein the feature extraction model is a model obtained by training a first network model based on second sample data, the second sample data comprising: a sample image, a sample feature, and a sample gray scale image, wherein the sample feature is a feature obtained by performing feature extraction on a sample object in the sample image, and the sample gray scale image is used for characterizing an area corresponding to the sample object in the sample image.

14. The electronic device according to claim 9, wherein the obtaining the weight parameter comprises:

displaying a first interface, the first interface comprising an input control for inputting the weight parameter; and in response to an operation of a user on the input control, obtaining the weight parameter.

15. The electronic device according to claim 9, wherein the generating the migration result image according to the fused feature and the target image comprises:

inputting the fused feature and the target image into a feature fusion model, and obtaining an output of the feature fusion model as the migration result image, wherein the feature fusion model is a model obtained by training a second network model based on third sample data, the third sample data comprising: a sample image, a sample fusion feature, and a sample migration result image corresponding to the sample image and the sample fusion feature.

16. The electronic device according to claim 9, wherein the target feature is a face feature obtained by performing feature extraction on a face to be made up in the target image, and the reference feature is a makeup feature obtained by performing feature extraction on makeup to be migrated in the reference image.

17. A non-transitory computer-readable storage medium having a computer program stored thereon, wherein the computer program, when executed by a computing device, causes the computing device to:

obtain a target feature and a reference feature, wherein the target feature is a feature obtained by performing feature extraction on a target object in a target image, and the reference feature is a feature obtained by performing feature extraction on a reference object in a reference image;

obtain a migration matrix, wherein the migration matrix is used for controlling the reference feature to be fused with the target feature at a designated weight;

fuse the target feature and the reference feature according to the migration matrix to obtain a fused feature; and generate a migration result image according to the fused feature and the target image, wherein the obtaining the migration matrix comprises:

obtaining a weight parameter, wherein the weight parameter is used for characterizing the designated weight; and obtaining the migration matrix according to the weight parameter and a pre-trained matrix, wherein the pre-trained matrix is a matrix obtained by training a preset matrix based on first sample data, the first sample data comprising: a first sample feature, a second sample feature, and a sample fusion feature corresponding to the first sample feature and the second sample feature.

* * * * *